United States Patent [19]
Cameron

[11] Patent Number: 5,318,684
[45] Date of Patent: Jun. 7, 1994

[54] SYSTEMS FOR THE DECOMPOSITION OF WATER

[76] Inventor: Charles Cameron, 235 N. Church, Bensenville, Ill. 60106

[21] Appl. No.: 945,908

[22] Filed: Sep. 17, 1992

[51] Int. Cl.$^5$ .................................... C25B 9/00
[52] U.S. Cl. .................................... 204/277; 204/278; 204/270; 204/DIG. 5
[58] Field of Search ............... 204/242, 275, 277, 278, 204/269, 270, DIG. 5

[56] References Cited

U.S. PATENT DOCUMENTS

| | | | |
|---|---|---|---|
| 4,457,816 | 7/1984 | Galluzzo et al. | 204/270 |
| 4,801,369 | 1/1989 | Draper et al. | 204/258 |
| 5,037,518 | 8/1991 | Young et al. | 204/129 |

Primary Examiner—Kathryn Gorgos
Attorney, Agent, or Firm—Armstrong, Westerman, Hattori, McLeland & Naughton

[57] ABSTRACT

A system adapted for use in decomposing water and separating an oxygen rich gaseous stream and a hydrogen rich gaseous stream. The system comprises an enclosure containing a decomposition zone, an oxygen separation zone and a hydrogen separation zone. The decomposition zone comprising an inlet for supplying a flow of water vapor, a plurality of conductive tubes arranged in a spaced array and connected in a parallel circuit including a source of electrical energy capable of supplying energy to all of the conductive tubes. The tubes in the array are elongated circular structures and preferably spaced less than one-eighth inch from each other.

20 Claims, 2 Drawing Sheets

SYSTEMS FOR THE DECOMPOSITION OF WATER

BACKGROUND OF THE INVENTION

The present invention generally relates to methods and systems for generating oxygen and hydrogen gases from water, and, more particularly, to methods and systems for decomposing water into oxygen and hydrogen gases utilizing electrical forces and for separating an oxygen rich gas and a hydrogen rich gas from the water decomposition products. The oxygen rich gas and the hydrogen rich gas which are produced can then be utilized together in a variety of applications such as an energy source for engines, in fuel cells and the like, or the gases can be used separately for uses known in the art.

While the systems of the present invention will be primarily discussed hereinafter with reference to their use in conjunction with the decomposition of water and the separation of the resultant gases into an oxygen rich gas and a hydrogen rich gas, it should be recognized that their use and application are not thereby so limited. For example, the systems may be utilized in the decomposition of materials other than water including the decomposition of products into component gases and the subsequent separation of the component gases into one or more gaseous streams rich in one or more of component gases produced.

Various systems and devices are known in the art for producing oxygen from water and water vapor alone or as contained in various other gases such as waste gases. One such device is disclosed in U.S. Pat. No. 4,263,112 to Aylward which relates to an electrolytic converter for electrolytically converting water and moisture vapor to oxygen and hydrogen for use in a closed environment, particularly in connection with space travel. The device includes a housing providing a cell chamber, an inlet for water vapor and outlets for oxygen and hydrogen, the chamber containing a cell assembly including a gas pervious catalytic anode, a gas pervious cathode and an electrolyte containing matrix member between the anode and the cathode providing a conductive path. The anode specifically incorporates a catalytic coating to effect electrolysis of water vapor to hydrogen ions and oxygen, the catalytic coating containing iridium oxide.

Another such system is disclosed in U.S. Pat. No. 4,254 086 to Sanders which relates to system wherein a mixture of gases containing hydrogen is prepared by the dissociation of water vapor at an elevated temperature in excess of 350° C. The resultant gaseous mixture containing hydrogen is then passed through a maze formed of a plurality of wafers of porous refractory material having a hydrogen permeable platinum group metal membrane. In the maze of wafers, hydrogen is separated to leave an oxygen enriched gas.

In addition, U.S. Pat. No. 4,747,925 to Hasebe et al discloses a system which simultaneously generates a mixed oxygen hydrogen gas by providing at least one pair of positive and negative electrodes opposed to each other in a tank of aqueous electrolyte solution which has a gas outlet. Also there are provided in the tank at least one pair of a magnetic member with the polarities thereof fixed in one and the same direction so that the forces therefrom will be directed upwardly in accordance with Fleming's left-hand rule in connection with the direction of the potential difference generated between the pair of electrodes. Oxygen and hydrogen produced in the system of the Hasbe patent are separated by interposing a diaphragm between the pair of electrodes and providing separate outlets for the respective gases.

The disclosures of the above patents are incorporated by references in their entireties.

Several disadvantages are inherent with such systems not including their relative complexity and relatively high costs associated therewith in term of equipment and energy costs. Among these disadvantages of conventional process for the electrolysis of water including those as noted above, there are the use of toxic compounds such as acids, acetate, ammonia, arsenic, asbestos, cadmium, carbon monoxide, caustic soda, chlorine, formaldehyde, methanol, mercury, phosphorous, cyanide and compounds of sulfur. As is readily apparent, use of these toxic materials involves environmental hazards as well as direct hazards to human safety.

In addition, many of the conventional processes and systems for the electrolysis of water use expensive precious metals and exotic organometallic compounds as catalysts or as composites of electrodes and electrolytic fluids. Furthermore, these processes and systems tend to utilize very high heat, very high pressures,, polychemical processes and the like and tend to operate slowly which pyramids equipment costs and magnifies equipment problems. In addition, such systems tend to be quite large and require significant amounts of energy for operation.

SUMMARY OF THE INVENTION

It is; therefore; a feature of the subject invention to provide a system for the decomposition of water into an oxygen rich stream and hydrogen rich stream which utilizes electrical forces alone.

It is another feature of the present invention to provide a system which is capable of recovering an oxygen rich stream from the decomposition of water.

It is another feature of the present invention to provide a system which is capable of recovering a hydrogen rich stream from the decomposition of water.

It is a further feature of the present invention to provide a water decomposition system which is able to operate with relatively low amounts of energy and thus has low operational costs.

It is another feature of the present invention to provide a water decomposition system which can be easily and simply constructed from relatively inexpensive components to thereby provide an operational system of a relatively low cost.

It is a further feature of the present invention to provide a system for the decomposition of water which utilizes dynamic and concentrated electrical forces so as to produce large volumes of both relatively pure hydrogen and relatively pure oxygen at a low cost.

It is also a feature of the present invention to provide a system which uses the dielectric properties of water, the paramagnetic properties of oxygen and the kinetic energy properties of hydrogen to realize a more efficient technique for the decomposition of water.

It is also a feature of the system of present invention to use electrical forces and spacing of the source of such electrical forces to provide and sustain radiation energy sufficient to facilitate the separation of hydrogen from oxygen and to force the restructure of the atoms as symmetrical homonuclear $H_2$ and $O_2$ molecules.

It is also a feature of the present invention to use the unique nature of hydrogen, oxygen and the composite water molecule and their ability to absorb energy at and above infra-red frequencies and provide resonant dissociation energy thereafter producing $H_2$ molecules and $O_2$ molecules and further conservation of energy for use in a water decomposition system which is continuous, dynamic and utilizes concentrated force in its cycles of operation.

It is also a feature of the systems of present invention to utilize the characteristics of electricity in the decomposition of water and, more particularly, to use electric fields, magnetic fields, the flow of current and electrical entrapment techniques to dissociate or decompose water and to control and separate the oxygen and hydrogen gases subsequent to their production.

It is a further feature of the present invention to eliminate the use of toxic compounds conventionally used in the electrolysis of water.

It is also a feature of the present invention to eliminate the use of the precious metals and exotic organometallic compounds as catalysts or as composites of electrodes and electrolytic fluids as conventionally used in electrolysis of water.

It is also a feature of the systems of the present invention to provide separate hydrogen and oxygen gaseous streams for use in a fuel cell, as a supplement to an internal combustion engine cycle or for other appropriate uses.

It is also a feature of the present invention to provide for the immediate use or consumption of these oxygen and hydrogen rich gases as they are produced so as to manage the overwhelming bulk storage and hazards associated therewith.

Briefly, in its broader aspects, the present invention comprehends a system adapted for use in decomposing water and separating an oxygen rich gaseous stream and a hydrogen rich gaseous stream, the system comprising an enclosure containing a decomposition zone, an oxygen separation zone and a hydrogen separation zone, the decomposition zone comprising means for supplying a flow of water vapor, a plurality of electrically conductive tubes arranged in a spaced cluster and connected in a parallel circuit containing a source of electrical energy capable of supply energy to all of the conductive tubes, the tubes in the zone being elongated circular structures and spaced less than about one-eighth inch from each other.

The present invention further comprehends a system adapted for use in decomposing water and separating an oxygen rich gaseous stream and a hydrogen rich gaseous stream, the system comprising an enclosure containing a decomposition zone, an oxygen separation zone and a hydrogen separation zone, the decomposition zone comprising means for supplying a flow of water vapor to the zone and means for decomposing the water vapor into gaseous mixture containing hydrogen and oxygen;

the oxygen separation zone communicating with the decomposition zone and adapted to separate oxygen from the gaseous mixture, the oxygen separation zone comprising at least one separation cluster assembly including a hollow gas pervious structure and a plurality of conductive electrical tubes adjacent to and spaced from the gas pervious structure in a spaced cluster, and means for withdrawing an oxygen rich gaseous stream from the interior of the gas pervious structure of the assembly, the plurality of conductive tubes connected in a parallel circuit containing a source of electrical energy capable of supply energy to all of the conductive tubes.

The hydrogen separation zone communicating with the oxygen separation zone and adapted to separate hydrogen from a gaseous mixture from the oxygen separation zone, the hydrogen separation zone comprising means for separating a hydrogen rich gaseous steam from the gaseous mixture from the oxygen separation zone, and means for withdrawing an hydrogen rich gaseous stream from the hydrogen separation zone.

Further features, objects and advantages of the present invention will become more fully apparent from a detailed consideration of the arrangement and construction of the constituent parts as set forth in the following description when taken together with the accompanying drawings.

DETAILED DESCRIPTION OF THE PREFERRED EMBODIMENTS

Figure 1:
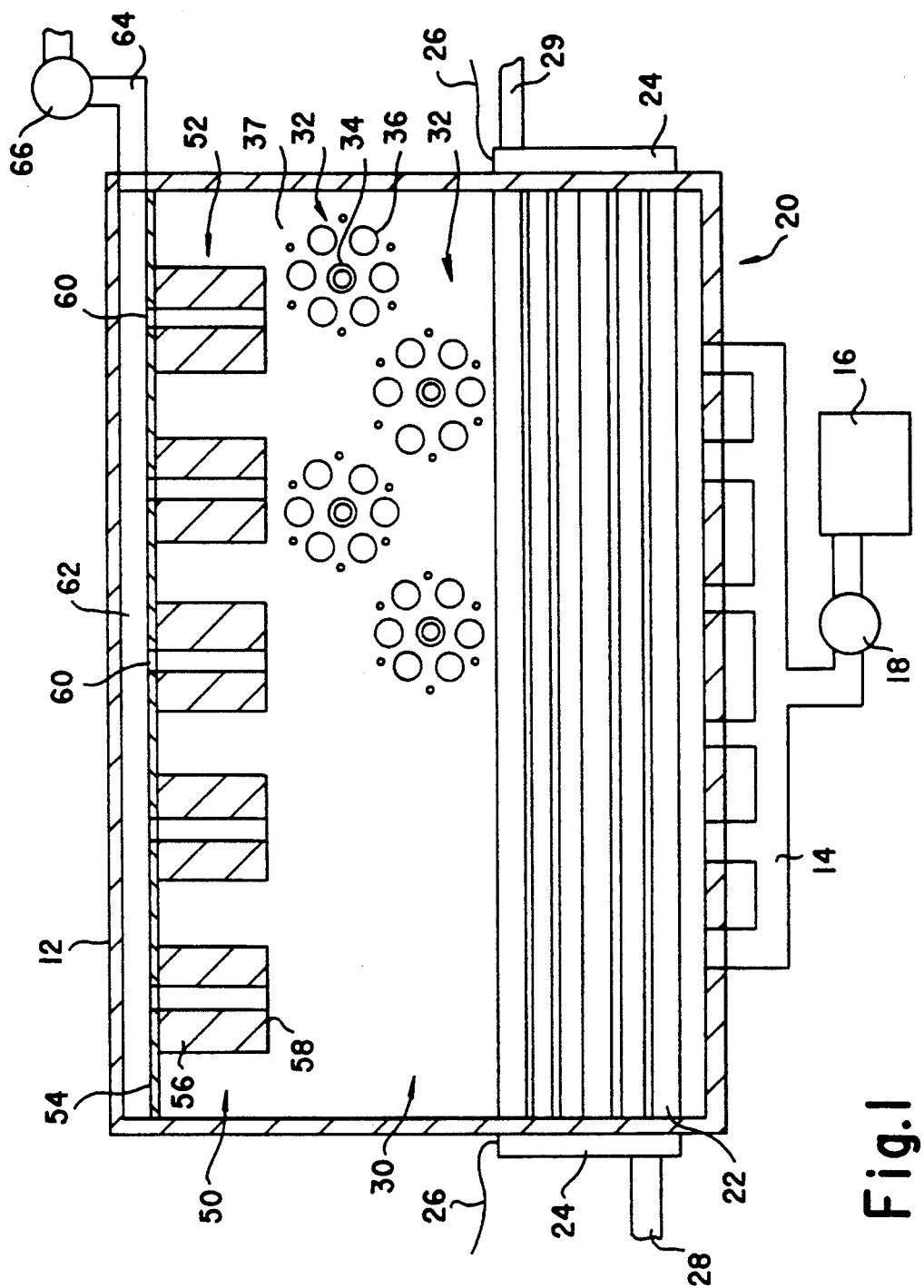
FIG. 1 is a cross-sectional schematic type view of a water decomposition system embodying one aspect of the principles of the present invention.
Figure 2:
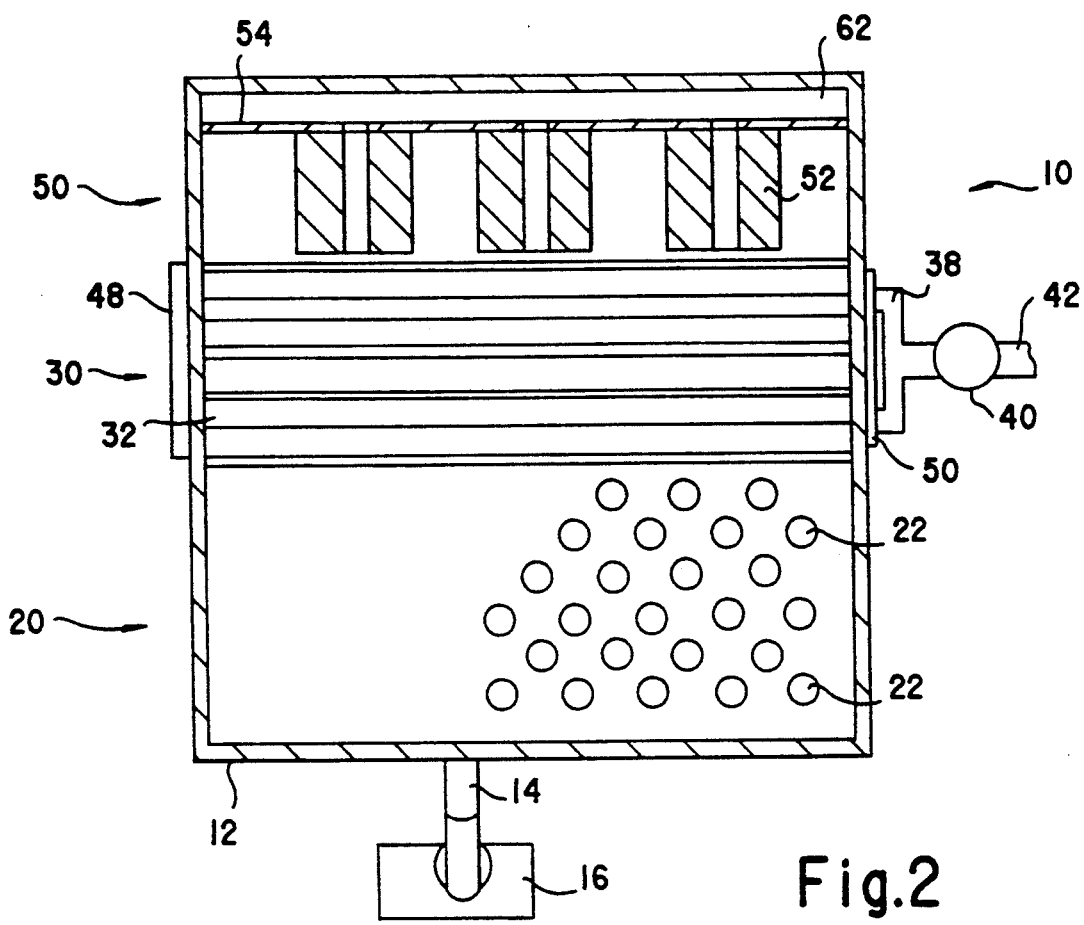
FIG. 2 is another cross-sectional view of the water decomposition system shown in FIG. 1.

Turning first to FIGS. 1 and 2, shown is a cross-sectional view of one embodiment of water decomposition system according to the present invention, the system being particularly adaptable for the decomposition of water vapor into the hydrogen and oxygen gases and the subsequent separation of these gases for use in fuel cells, internal combustion engines and the like. System 10 as shown in cross-section in FIGS. 1 and 2 is not necessarily illustrated in scale and should be considered somewhat schematic illustrations.

In the embodiment shown in FIGS. 1 and 2, system 10 comprises enclosure 12 shown generally in the form of rectangular parallelepiped having inlet manifold 14. Enclosure 12 is made of any suitable generally gas-impermeable material such as from metals, polymers, combinations thereof and the like. Communicating with inlet manifold 14 is a source 16 of water vapor which is drawn through the inlet into enclosure 12 by fluid pump 18 between the source and the enclosure. Source 16 of water vapor may be of any appropriate type such as, for example, a heated and/or evacuated enclosure which contains liquid water.

Contained within the lower portion of enclosure 12 is decomposition zone 20 where introduced water vapor is decomposed to a gaseous mixture containing both hydrogen gas and oxygen gas. Decomposition zone 20 includes a plurality of electrically conductive elongated hollow tubes 22 arranged in a spaced parallel sequence or array and in close proximity to each other. A presently preferred sequence of tubes 22 is shown in FIG. 1 with each one-inch diameter tube being spaced less than one tube diameter away from the adjacent tubes, more preferably, less than one-half tube diameter from adjacent tubes, most preferably, approximately one-eighth inch apart.

The number of tubes 22 utilized in the decomposition zone may vary considerably depending upon, among other things, the particular diameter of the tubes, the spacing between the tubes, the amount of water vapor to be decomposed, the character and or amount of applied electrical forces, the temperature of the water vapor, desired conversation rate, and the like. Other factors such as cost, ease of manufacture and efficiency may also tend to dictate the actual number of tubes used. The number of tubes shown in FIGS. 1 and 2 is for illustrative purposes only as it is contemplated that the number of tubes utilized can vary widely and that tubes of different diameters and lengths may be used in conjunction with each other. While the tubes 22 preferably are circular in cross-section so as to generate transverse magnetic fields and circulatory polarized electrical fields, other cross-sectional shapes may be utilized as well. Preferably, tubes 22 are essentially identical to each other so that problems of tuning are minimized.

As is best shown in FIG. 2, electrically conductive tubes 22 extend in their axial direction in a generally parallel relationship. Both open ends of all conductive tubes 22 fit into and protrude through insulator fittings in the walls of the enclosure.

Each of the distal ends of electrically conductive tubes 22 are electrically connected in a parallel circuit to a source of electrical power (not shown) by electrical leads 26. The source of electrical power can be of or converted to alternating current type, the tubes being connected in parallel to the source of electrical power. Preferably, the source of electrical power provides electrical energy at high frequency, e.g., at a frequency at or below microwave frequency which is generally considered to be about $10^9$–$10^{11}$ Hz.

The invention frequency levels within a preferred $10^8+$ to $10^9$ range increase higher frequency surface layer conductance and minimize interstitial resistance losses within the crystal structure of the metal conductors. This maintains the commonalities of uniform tube dimensions and the parallel functions which simplify the electronics. This surface layer conduction has little effect on the radiations exuded as they are subject to the laws of refractions and diffusion representing the conservation of energy of the system. The induction of this energy into the molecules of water within the concentration vortices provide the escalation to infrared spectra contributing to scattering and restructure of the molecules.

Conductor leads 26 preferably are electrically insulated from the remainder of the enclosure 12. Common flow means 24 in this embodiment serves a manifold for introducing and withdrawing a flow of cooling fluid such as air contained in pipes 28 and 29 which flows through each of the interior of tubes 22 for heat exchange purposes such as for providing cooling thereof.

In a particularly preferred embodiment of the invention, tubes 22 are of thin-walled copper and are about thirty-six inches long with a diameter of about one inch. Such tubes are arranged in spaced parallel relationship with a uniform spacing of about 0.1 to 0.2 between the tubes, a particularly preferred spacing being about one-eighth inch. The term "spacing" in the context of the tubes refers to the shortest distance between the external surfaces of adjacent tubes.

Figure 3:
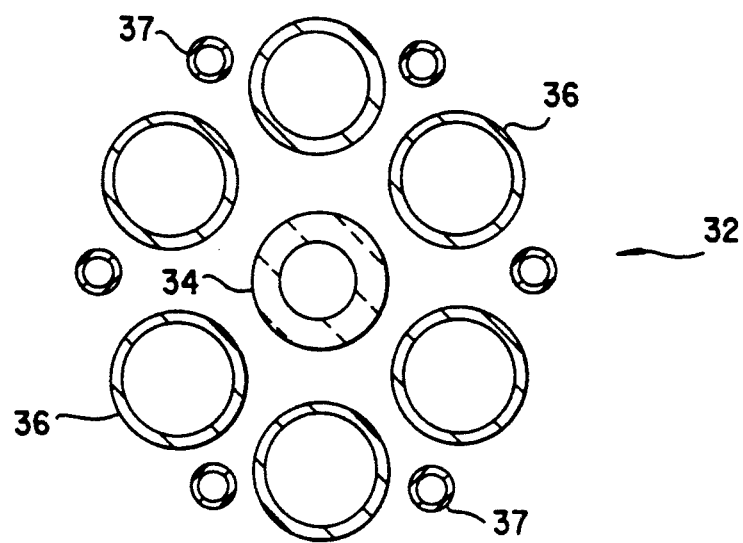
FIG. 3 is a detailed cross-sectional view of an assembly for use in the oxygen separation zone of the system shown in FIGS. 1 and 2.

Situated directly above decomposition zone 20 within enclosure 12 is oxygen separation zone 30 which includes one or more oxygen separation assemblies 32, four such assemblies being shown in the drawing for the purposes of illustration. Each assembly 32 comprises a central oxygen pervious structure 34 having an open central portion which is surrounded by a plurality of electrically conductive tubes 36 and 37. As is best shown in FIG. 3, each oxygen separation assembly has oxygen pervious structure 34 surrounded in this embodiment by six one-inch conductive tubes 36 and six one-quarter inch spaced conductive tubes 37. Both ends of all conductive tubes fit into and protrude through insulator fittings in both walls of the enclosure 12.

Oxygen pervious structures 34 of oxygen separation zone 30 are closed on one end and, on the other end, extend through a side wall of enclosure 12 and communicate with a manifold 38 thereby forming an outlet for an oxygen rich gas stream. Manifold 38 communicates with vapor pump 40 which draws the oxygen-rich stream from the oxygen separation zone 30 and outlet pipe 42 from the vapor pump feeds the oxygen rich stream to storage or to immediate use (not shown).

The longitudinal axes of gas pervious structures 34 are oriented in a plane relative to each other and extend transverse to the flow of gas through oxygen separation zone 30. As is best shown in FIG. 3, hollow gas pervious structures 34 each comprise a circular wall 44 defining an open volume 46 and having one end closed by end wall. Particularly suitable materials for forming hollow structures 34 include silica based materials such as molecular sieve type materials composed primarily of crystalline silica optionally containing various ions such as transition metal ions including Pd and Mn. Hollow structures in addition may be composites of various porous materials as well as various materials formed into contiguous layers or even commingled or mixed together into a suitable composite mass. In addition, the construction of wall 44 for each gas pervious structure 34 may contain a structural support such as wire mesh, wire and the like either embedded in the structure or in close proximity thereto. Preferably pervious tubes 34 are of material which is pervious to oxygen gases.

One presently preferred, method for construction of hollow structures 34 is by forming or pressing powders of suitable constituents including appropriate binders such as polymeric resins into the requisite hollow tubular shape by use of steel mandrel or the like and then subjecting the powders to an elevated temperature so as to sinter the powders into a coherent, porous structure. Consumable organic fillers such as resins and wood flour may be incorporated into the initial material to provide increased porosity after sintering. The resultant hollow structures may be in the form of a molecular sieve.

Conductive tubes 36 and 37 arranged about pervious structure 34 of each assembly 32 are electrically connected to common conductor 48 and 50, each adjacent a side wall of enclosure 12, and are supplied with electrical energy by a suitable source (not shown). Conductive tubes 36 and 37 may be similar to tubes 22 of the decomposition zone 20 and be of thin-walled copper and have dimensions of about thirty-six inches long with diameters of about one inch and one-quarter inch respectively. Like tubes 22, tubes 36 and 37 should be essentially identical to those tubes of a common type to minimize tuning.

Conductive tubes 36 may also be arranged in spaced parallel relationship about pervious tube 34 of the assembly 32 with a uniform spacing of about 0.1 to 0.2 inch between the tubes, a particularly preferred spacing being about one-eighth inch. Like tubes 22, conductive tubes 36 and 37 are connected in parallel to the source of electrical alternating current power, preferably of high frequency.

The forces used for water decomposition by this invention are supplied by electromagnetic high frequency transverse radiations from the conductive tubes 22 of zone 20 and the power for oxygen separation is supplied by conductive tubes 36 and 37 of zone 30. This use of radiative electrical energy is somewhat analogous to electrical induction. It is not an electrolysis technique and it does not create ionizations. There are no cathode or anode electrodes and no electrolyte medium. The conductive tubes do not provide or acquire mass from the fluid and they do not acquire or provide electrons to the fluid.

Directly above oxygen separation zone 30 is hydrogen separation zone 50. Zone 50 includes a plurality of downwardly extending cylindrical or box-like filters 52 extending from upper wall 54. Each filter 52 includes cylindrically shaped filter material 56 closed at the lower end by gas impermeable web 58. The upper end of the filter 52 is joined to wall 54 and encloses and surrounds opening 60 in the wall.

Although filters 52 are shown in this embodiment to be cylindrical type filters, other configurations for the filters could also be used. For example, the filters could be planar and rectangular in configuration and arranged in closed pairs such that an enclosed volume communicating with the opening in wall 54 is realized in conjunction with gas impermeable web 58.

The space above hydrogen separation zone 50 defined by wall 54 and the sides and top of enclosure 12 is hydrogen passageway 62 which communicates with hydrogen outlet 64 from enclosure 12 and with hydrogen vapor pump 66. The outlet of hydrogen pump 66 communicates with outlet pipe 68 which in turn leads to a suitable storage vessel or to a device for immediate use of contained gases (not shown).

In operation of the embodiment of the system shown in FIGS. 1 and 2, source 16 supplies water vapor for vaporization by pump 18 for processing within decomposition zone 20. The flow of water vapor generated by pump 18 passes through inlet manifold 14 and enters decomposition zone 20 in the lower portion of enclosure 12. Source of electrical energy (not shown) connected to conductive tubes 22 supplies high frequency alternating current to the conducting tubes in the decomposition zone 20. The electrical and magnetic fields created in the vicinity of tubes 22 cause water vapor molecules in close proximity to such tubes to absorb energy and disassociate into hydrogen atoms and oxygen atoms. The atoms of each species are forced to combine in the decomposition zone 20 to form oxygen $O_2$ and hydrogen $H_2$ molecules which as a gaseous mixture are drawn upwardly into the oxygen separation zone 30. Motivation for the upward movement is provided by the suctions of evacuation pumps 40 and 66 which are removing pure oxygen and hydrogen. Further upward surge of hydrogen continues to separation zone 50 because of its much lighter character than oxygen, i.e., $H_2$ is mass 2 vs $O_2$ which is mass 32.

The application of electrical forces to conductive tubes 22 in water decomposition zone 20 provides strongly attractive magnetic forces between the parallel adjacent tubes resulting from the concurrent conduction. There are no electromagnetic fields inside the tubes. Alternating electric and magnetic forces are continually being oscillated transverse to the direction of the conduction and each water molecule is thereby repeatedly buffeted by high frequency radiation. The angular moment of each electron is subject to magnetic force torque (axial repositioning) and saturated by the energizing electric waves from the tuned circuit. The high frequency waves impacting the water vapor molecule cumulatively heat the molecule.

In the oxygen separation zone 30, the oxygen and hydrogen components of the mixture come into close proximity to the assemblies 32 forming part of the zone. Alternating electrical current from a suitable source of electrical energy is caused to flow through the conductive tubes 36 and 37 thereby generating intense electrical and magnetic fields in the spaces adjacent to and between the conductive tubes. Paramagnetic oxygen $O_2$ contained in the water decomposition mixture is drawn into the oxygen gas pervious structures 34 located in the central portion of the assemblies 32 whereas diamagnetic hydrogen $H_2$ is repulsively excluded magnetically from the assemblies due to the electrical and magnetic forces existing about the assemblies. Vapor pump 40 creating a partial vacuum within the interior of hollow porous structures 34 thus tends to draw an oxygen rich stream from the oxygen separation zone and through outlet 42.

The remaining gaseous hydrogen flows upwardly by convection from the oxygen separation zone 30 into hydrogen separation zone 50. The hydrogen is drawn into filters 52 through which basically only hydrogen can pass and the hydrogen rich gaseous stream upstream from filters flows through passage 64 by the partial vacuum created by third vapor pump 66. The silica gel filter material 56 is totally impervious to any oxygen molecules while hydrogen molecules migrate rapidly through the filters. The hydrogen rich gaseous stream exists system 10 via outlet 68 for storage or for immediate use.

Turning again to FIG. 3, shown is a detailed cross-sectional view of assembly 34 shown in FIGS. 1 and 2. Structure 34 is in the central location of each assembly 32 with the conductive tubes equally spaced about the structure. In the embodiment shown, the conductive tubes are of two sizes, the tubes 36 closer to structure 34 being of a larger size whereas the outer tubes 37 are of a significantly smaller size. A presently preferred sizes for the larger tubes 36 is about one inch diameter and a presently preferred size for the smaller tubes 37 is about one-quarter inch.

It should be specifically noted that tubes 36 are equally spaced about the periphery of structure 34 and thus there is equal spacing among the tubes of the same size. The use of the smaller tubes enables even smaller spacing to be realized and thus the generation of greater repulsive magnetic fields which shields structure 34 from the diamagnetic $H_2$ molecules and contributes to the overall efficiency of the system.

As is apparent to those of skill in the art to which the present invention pertains, the systems according to the present invention provides many significant advantages in the decomposition of water into oxygen and hydrogen and in the subsequent separation of the hydrogen and oxygen components. Among others, the system provides a more efficient technique for the decomposition of water than current technologies which use electrodes, electrolytic fluids, cells and cathode-anode terminals.

The present invention also uses vapor pumps to replace the air in the enclosure with water vapor and maintain sub-atmospheric pressure below that of the external air. This technique removes the oxygen and nitrogen molecules which would interfere with the decomposition of water and which would also mix with and contaminate the produced hydrogen and oxygen gases. In addition, the use of subatmospheric pressure during decomposition induces expansion of the water vapor which thereby greatly enhances the efficiency of the process occurring within the system by reducing the volume of molecules present and also by reducing the hydrogen bonding and other molecular restraints. This phase change to water vapor adds to the internal energy of the molecules and substantially increases the energy absorbing capacity of the water molecules.

Furthermore, the systems of the patent invention are very flexible and can be tuned and manipulated with various levels of voltage and high frequency, with special spacing and dimensions of components, with limited amperage, limited resistance and limited creation of heat. Adjustment of the electrical performance of the system can be accomplished by transformers, diodes, capacitors, inductors, resistors, amplifiers and other electronic controls.

While not being wished to be bound to any particular theory as to the operation of the systems of the present invention, it is believed that the structures and properties of water molecules and oxygen and hydrogen atoms are fundamental to the operation of the systems of this invention. Specifically, important to the systems is that fact that water molecules have a very high dielectric constant with separate positive and negative polarity in the individual molecule. In addition, the oxygen atom is strongly electronegative because the atom has two unmatched paramagnetic electrons and hydrogen has greater kinetic energy, velocity and excitation energy than any other gas.

In the water molecule, the bonding electrons between the hydrogen atoms and the oxygen atom are controlled by the oxygen atom and are located between the nucleus of each hydrogen and the oxygen atom with very limited proximate forces between the two hydrogen atoms. The potential energies of these bonding electrons are more flexible and more excitable than the other electrons of the molecule. By supplying energy to excite these bonding electrons and the hydrogen nuclei and by stretching these bonds beyond the 20% required for scattering, this system provides an electrical technique for the production of the relatively pure gases at a minimal cost.

For the purposes of the present invention, the dimensional relationship between the parallel conductive tubes is very important to achieve concentrated forces acting on the molecules. With such concentrated forces, the typical three dimensional freedom of motion for gaseous molecules is effectually restricted to one dimensional status. The close preferred one-eighth inch contiguous spacing between the circuit tubes establishes a proximity defined by the spacing to an electromagnetic high frequency radiation source for all water vapor molecules during their presence in the decomposition zone. As is well known, electric radiation as well as magnetic radiation is subject to inverse-square-of-distance relationship type physics. With the provisions of the subject system, however, each molecule in the decomposition zone is at all times radiated from all directions with strong magnetic and electric waves of the desired frequency and is also subject to cumulative conservation of energy physics.

The spacing between the conductive tubes is also of fundamental importance to sustaining and accumulating energy absorbed by the $H_2O$ water molecules in the decomposition process. Water molecules tend to absorb energy from all frequencies of the spectrum and especially from and above the infrared range of the spectrum. Radiation energy absorbed by excited atoms and molecules will be re-emitted almost immediately unless conditions preclude normalization to ground state as per quantum mechanics. Re-emissions normally occur at the next lower frequency with applicable extended wavelength, etc. which for the conditions of this process represent at microwave frequencies and wavelengths. These re-emittable microwavelengths exceed the spacing between the invention conduction tubes which effectively prevents re-emissions by the excited $H_2O$ molecules via microwave wavelengths of the spectrum. This 'Casimir Effect' wavelength inhibiting feature of the process constructively sustains the excited state of the molecule which is subject to constantly increasing radiation from the electric fields supplied by the conductive tubes.

In summary, this dynamic system provides oscillating magnetic forces, electrical forces, thermal accumulation of heat forces, conservation of energy accumulations and constant reinforcing radiations from each conducting tube providing 360° transverse radiations. Each radiating tube is simultaneously participating in six electromagnetic vortex entrapments of dipole water molecules between itself and two additional participating proximate tubes at 30°, 90°, 150°, 210°, 270° and 330° angles. The constant radiation energies, the very close restricting metal surfaces and the electromagnetic entrapments confine the $H_2O$ molecules, excite the bonding electrons of the polar dielectric water molecules and separate the atoms which are forced to recombine symmetrically as paramagnetic $O_2$ and diamagnetic $H_2$ molecules. The homonuclear non-polar $O_2$ and $H_2$ molecules are normalized to quanta levels and ground state orbit frequencies required by the angular moments of the $O_2$ and $H_2$ electrons respectively. Quantum mechanics physics dictates expulsion of the infra-red spectra and the stable molecules migrate rapidly through the process pulled upward by convection and the inverse pressure created by vacuum pumps 40 and 66.

The space between the conductive tubes of the invention system is continually radiated with oscillating magnetic waves and with converging circularly polarized electrical waves. The strong magnetic fields exert torques on all electrons of all of the molecules within the vortex entrapments. This imposes a chaotic instability which disrupts the symmetries of the electrons of the atoms within the space. Disruption of the angular spins, magnetic moments, energy quanta levels, etc. induces inundation of concentration of forces electrical converging waves.

The water molecules are drawn into the spacing by the thruput flow and the strongly attractive electrical fields within the electromagnetic entrapments which electrostatically restrain and will not release the oxygen dipole of the water molecules. The hydrogen atoms are dissociated by the massive influx of electrical waves and immediately combine as $H_2$ stable molecules with an electron configuration comparing to helium. The oxygen atoms are forced to combine as $O_2$ to attain symmetrical and stable status and to exit the entrapments.

In the oxygen separation zone, the assemblies of conductive electromagnetic tubes with applied electrical energy produce a radiant magnetic shield which tends to deflect the hydrogen $H_2$ diamagnetic molecules. At the same time, the electrical forces generated by the assemblies allow passage of the oxygen $O_2$ paramagnetic molecules into a selective central structure under the suction influence of the second vapor pump 40 which removes an oxygen-rich gaseous stream from the oxygen separation zone.

Molecules that are diamagnetic such as the hydrogen $H_2$ and nitrogen $N_2$ molecules have an opposing repulsion to magnetic fields while molecules that are paramagnetic such as oxygen $O_2$ and water vapor $H_2O$ molecules have no such opposition. This diamagnetic feature is a manifestation of the stability of bonds between the internal atoms and the symmetry of + and − charges within the molecule.

The subject system further has inexpensive modular expansion features in that the system will function with many additional modules requiring only small remote clones to service each module connected to the central system for further supplying the oxygen rich and hydrogen rich gaseous output streams.

While there has been shown and described what is considered to be preferred embodiment of the present invention, it will be apparent to those skilled in the art to which the invention pertains that various changes and modification may be made therein without departing from the invention as defined in the appended claims.

It is claimed:

1. A system for use in decomposing water and separating an oxygen rich gaseous stream and a hydrogen rich gaseous stream, the system comprising an enclosure containing a decomposition zone, an oxygen separation zone and a hydrogen separation zone, the decomposition zone comprising means for supplying a flow of water vapor to the zone and means for decomposing the water vapor into gaseous mixture containing hydrogen and oxygen molecules, said means for decomposing the water vapor including a plurality of electrically conductive metallic tubes arranged to allow gaseous flow about the tubes and connected to a common source of electrical energy supplying a flow of alternating current through all of the conductive tubes in the decomposition zone;

the oxygen separation zone communicating with the decomposition zone and used to separate oxygen from the gaseous mixture, the oxygen separation zone comprising at least one separation assembly including a central hollow gas pervious structure and a plurality of electrically conductive tubes adjacent to and equally spaced from the gas pervious structure in a spaced cluster, and means for withdrawing an oxygen rich gaseous stream from the interior of the gas pervious structure of the assembly, the plurality of conductive tubes connected in a parallel circuit containing a source of electrical energy supplying alternating current to all of the conductive tubes, the hydrogen separation zone communicating with the oxygen separation zone and used to separate hydrogen from a gaseous mixture from the oxygen separation zone, the hydrogen separation zone comprising means for separating a hydrogen rich gaseous steam from the gaseous mixture from the oxygen separation zone, and means for withdrawing an hydrogen, rich gaseous stream from the hydrogen separation zone.

2. A system in accordance with claim 1, wherein the tubes of the decomposition zone are elongated circular structures and spaced less than one-eighth inch from each other.

3. A system in accordance with claim 2, wherein the electric conductive tubes of the oxygen separation zone are spaced from about 0.1 to 0.2 inches from each other.

4. A system in accordance with claim 1 wherein the conductive tubes of the oxygen separation zone are spaced from about 0.1 to 0.2 inches from each other.

5. A system in accordance with claim 1, wherein the oxygen separation zone communicates with means for causing flow of an oxygen rich gaseous stream out of the enclosure.

6. A system in accordance with claim 1 wherein the gas pervious structure is hollow such that the interior has an open space communicating with the exterior of the flow passage, and means for withdrawing an oxygen rich gaseous stream creates at least a partial vacuum within the hollow interior of the structure.

7. A system in accordance with claim 6, wherein the means for removing hydrogen from the gaseous mixture from the oxygen separating zone includes at least one filter containing silica gel.

8. A system in accordance with claim 1, wherein the gas pervious structure is in the general shape of a tube with the interior of the tube communicating with the exterior of the structure.

9. A system in accordance with claim 1, wherein the means for removing hydrogen from the gaseous mixture from the oxygen separating zone includes at least one filter containing silica gel.

10. A system in accordance with claim 1, wherein the electrically conductive shield tubes in the cluster about the hollow gas pervious structure of the oxygen separation zone are elongated structures having a circular cross-section and are spaced less than one-eighth inch from each other.

11. A system for use in decomposing water and separating an oxygen rich gaseous stream and a hydrogen rich gaseous the system comprising an enclosure containing a decomposition zone, a oxygen separation zone and a hydrogen separation zone, the decomposition zone comprising means for supplying a flow of water vapor, a plurality of electrically conductive metallic tubes arranged in a spaced cluster and connected in a parallel circuit including a source of electrical energy supplying an alternating current to all of the conductive tubes, the tubes in the cluster are elongated circular structures and spaced less than one-inch from each other and arranged in alternating sequence to create an electromagnetic vortex concentration-of-forces applied to all vapor therein and where the oxygen separation zone communicating with the decomposition zone comprises at least one separation assembly including a central hollow gas pervious structure and a plurality of electrically conductive tubes adjacent to and equally spaced from the gas pervious structure in a spaced cluster, means for withdrawing the oxygen rich gaseous stream from the interior of the gas pervious structure, and the plurality of conductive tubes connected in a parallel circuit containing a source of alternating current which is supplied to all of the tubes.

12. A system in accordance with claim 11, wherein the oxygen separation zone includes a plurality of electrically conductive tubes spaced about a hollow gas pervious structure.

13. A system in accordance with claim 12, wherein the electrically conductive tubes in the cluster about the hollow gas pervious structure are elongated structures having a circular cross-section and are spaced less than one-inch from each other.

14. A system in accordance with claim 13, wherein the conductive tubes about the gas pervious structure are spaced from about 0.1 to 0.2 inches from each other.

15. A system in accordance with claim 14, wherein the conductive tubes are of two different diameters.

16. A system in accordance with claim 11, wherein the conductive tubes are hollow and the system further includes means for moving cooling air through the interior of the conductive tubes.

17. A system in accordance with claim 11, wherein the hydrogen separation zone includes means for removing hydrogen from a gaseous mixture from the oxygen separating zone and includes at least one filter containing silica gel.

18. A system in accordance with claim 11 wherein the source of electrical energy provides high frequency of electrical energy at or below microwave frequency.

19. A system in accordance with claim 11 wherein the conductive tubes in the decomposition zone are spaced from about 0.1 to 0.2 inches from each other.

20. A system in accordance with claim 11, wherein the oxygen separation zone includes means for separating diamagnetic gases from paramagnetic molecules which includes a cluster of parallel electrical high frequency conductive tubes which create an electromagnetic shield through which the paramagnetic molecules can pass while the diamagnetic molecules are deflected therefrom.

* * * * *